US009278404B2

(12) United States Patent
O'Donnell et al.

(10) Patent No.: US 9,278,404 B2
(45) Date of Patent: Mar. 8, 2016

(54) TANDEM BURIED ARC WELDING

(75) Inventors: Timothy O'Donnell, Chesterland, OH (US); Elmar Schwill, Essen, DE (US)

(73) Assignee: LINCOLN GLOBAL, INC., City Of Industry, CA (US)

(*) Notice: Subject to any disclaimer, the term of this patent is extended or adjusted under 35 U.S.C. 154(b) by 938 days.

(21) Appl. No.: 13/366,128

(22) Filed: Feb. 3, 2012

(65) Prior Publication Data
US 2013/0200054 A1    Aug. 8, 2013

(51) Int. Cl.
*B23K 9/173*    (2006.01)
*B23K 9/09*    (2006.01)
*B23K 9/095*    (2006.01)
*B23K 9/12*    (2006.01)

(52) U.S. Cl.
CPC ............. *B23K 9/1735* (2013.01); *B23K 9/09* (2013.01); *B23K 9/0953* (2013.01); *B23K 9/121* (2013.01)

(58) Field of Classification Search
CPC ...... B23K 9/0017; B23K 9/09; B23K 9/1735; B23K 9/121; B23K 9/0953
USPC .......................................... 219/130.1, 137 R
See application file for complete search history.

(56) References Cited

U.S. PATENT DOCUMENTS

| 4,806,735 | A | 2/1989 | Ditschun et al. |
| 6,627,839 | B1 * | 9/2003 | Luckowski et al. ........ 219/76.14 |
| 2006/0243704 | A1 | 11/2006 | Matz et al. |
| 2007/0145028 | A1 | 6/2007 | Artelsmair |
| 2008/0011727 | A1 * | 1/2008 | Peters ....................... 219/130.5 |
| 2010/0213179 | A1 | 8/2010 | Peters |

FOREIGN PATENT DOCUMENTS

| EP | 1077102 A2 | 2/2001 |
| JP | 55139179 A * | 10/1980 |
| WO | 2006111867 A1 | 10/2006 |

OTHER PUBLICATIONS

Motta M. F., et al.; "A Study on Out-Of-Phase Current Pulses of the Double-Wire MIG/MAG Process . . . "; DVS German Welding Society, vol. 1, ;(2005); pp. 26-32, XP001239460, ISSN: 1612-3433.

* cited by examiner

*Primary Examiner* — Jianying Atkisson
(74) *Attorney, Agent, or Firm* — Perkins Coie LLP

(57) ABSTRACT

A system and method is provided in which at least two welding power supplies are coupled to respective weld torches where the power supplies each provide a pulse welding waveform to their respective weld torches such that the welding pulses are out of phase with each other such that the respective welding pulses do not overlap during welding. The system also includes a ground current switch which switches the ground current path during welding to minimize arc interference and arc blow.

22 Claims, 3 Drawing Sheets

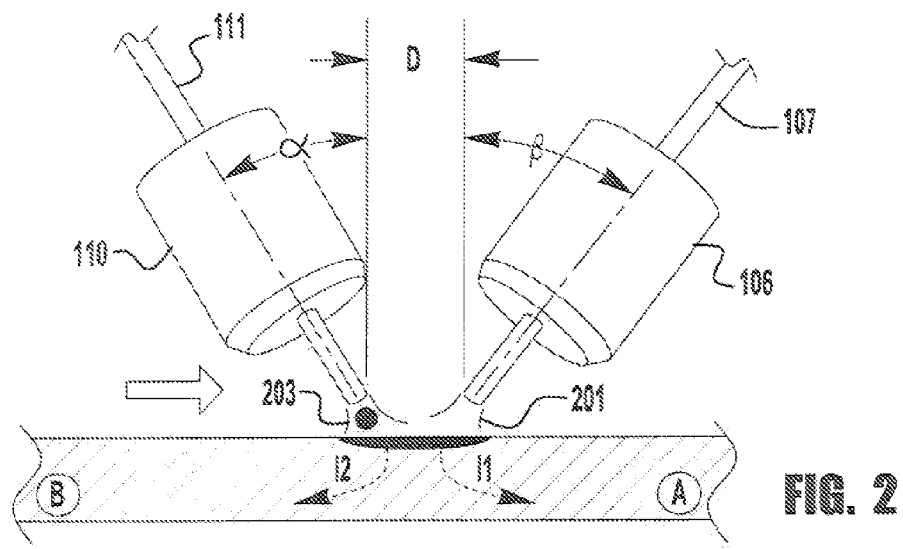
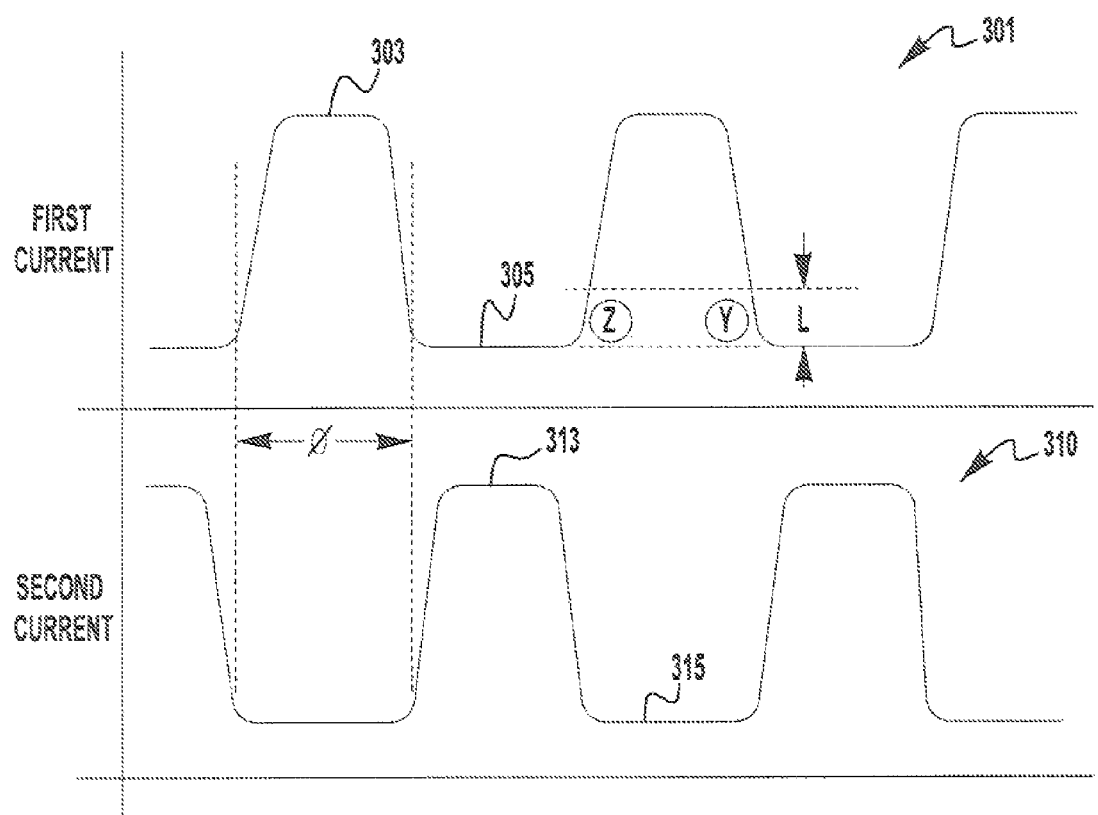
FIG. 2
FIG. 3

TANDEM BURIED ARC WELDING

BACKGROUND OF THE INVENTION

1. Field of the Invention

Systems and methods of the present invention relate to welding and joining, and more specifically to tandem buried arc welding.

2. Description of the Related Art

As advancements in welding have occurred, the demands on welding throughput have increased. Because of this, various systems have been developed to increase the speed of welding operations, including systems which use multiple welding power supplies that direct their respective welding currents to the same welding operation. While these systems can increase the speed or deposition rate of a welding operation, the different welding arcs, created by the multiple power supplies, can interfere with each other causing arc blow and other problems during welding. Thus, improved systems are desired.

BRIEF SUMMARY OF THE INVENTION

Exemplary embodiments of the present invention include systems and methods which have at least one leading power supply electrically coupled to a leading electrode, where the leading power supply provides a first welding waveform to the leading electrode to deposit the leading electrode into a weld joint via a first welding arc, and the first welding waveform comprises a plurality of pulses having a peak current level. Also included is at least one trailing power supply electrically coupled to a trailing electrode, where the trailing power supply provides a second welding waveform to the trailing electrode to deposit the trailing electrode into the weld joint via a second welding arc, and the second welding waveform comprises a plurality of pulses having a peak current level. At least one of the first and second welding waveforms is controlled such that the peak current levels of the pulses of the first welding waveform are out of phase with the peak current levels of the pulses of the second welding waveform.

BRIEF DESCRIPTION OF THE DRAWINGS

The above and/or other aspects of the invention will be more apparent by describing in detail exemplary embodiments of the invention with reference to the accompanying drawings, in which:

FIG. 2 is a diagrammatical representation of an welding operation with an exemplary embodiment of the present invention;

FIG. 3 is diagrammatical representation an exemplary welding waveform used in embodiments of the present invention;

DETAILED DESCRIPTION OF EXEMPLARY EMBODIMENTS

Figure 1:
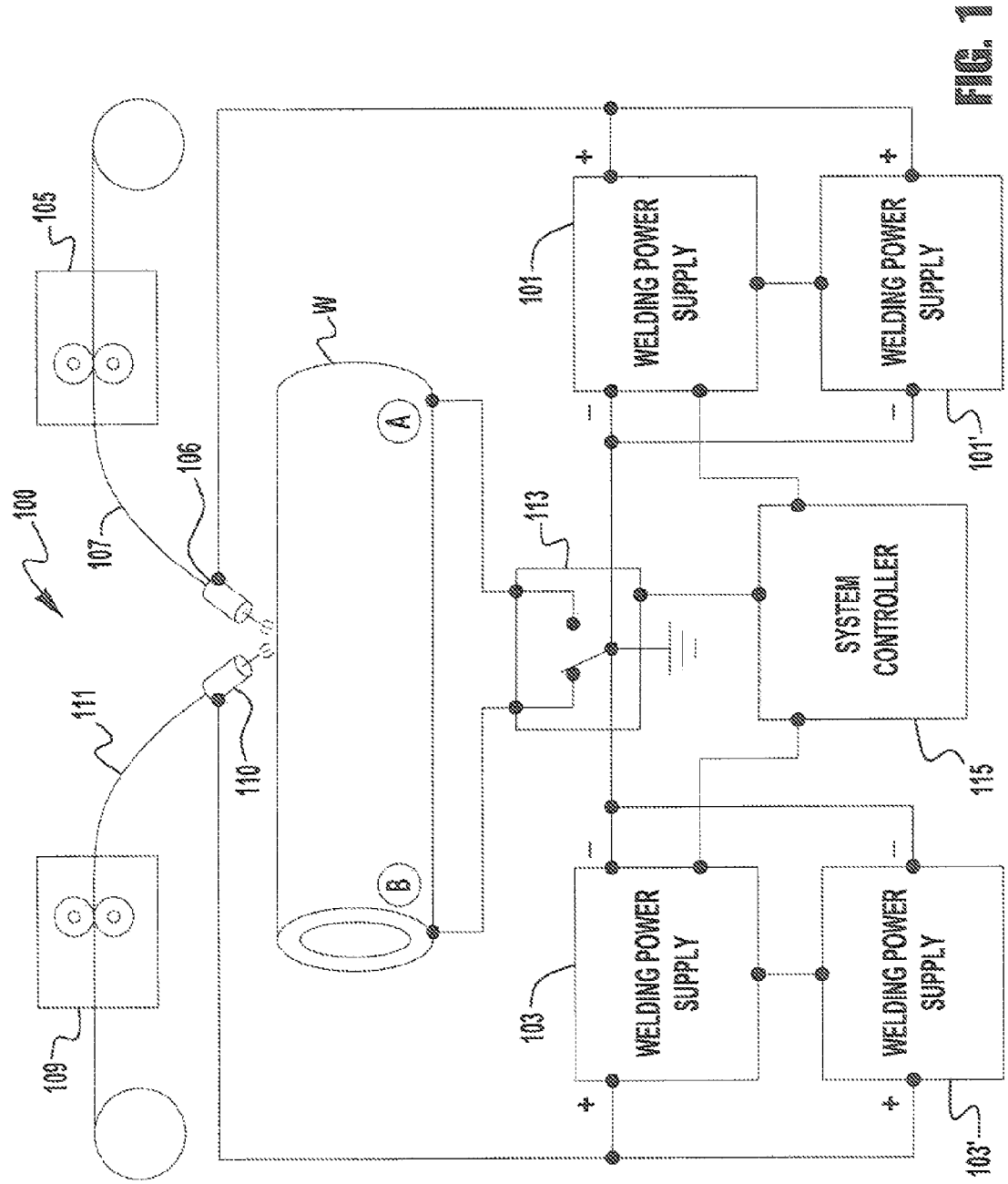
FIG. 1 is a diagrammatical representation of an exemplary embodiment of a welding system according to the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts a welding system 100 in accordance with an exemplary embodiment of the present invention. The system 100 contains at least two welding power supplies 101 and 103. In the embodiment shown there are a total of four welding power supplies, where the power supplies are configured in a parallel configuration such that an increased available current is provided. For example, power supplies 101 and 101' are configured in parallel, and power supplies 103 and 103' are configured in parallel. As stated, this is done to increase the overall available current that can be provided to the torches 106 and 110, respectively. However, such a configuration is not necessary as each torch 106/110 can receive current from a single welding power supplies, respectively.

The power supplies 101, 101', 103 and 103' are power supplies capable of pulse welding in either a DC and/or AC welding mode. Such power supplies can be of the type used for sub-merged arc welding, or tack welding for large work pieces such as large diameter and thick-walled pipes. An example of such a power supply is the Power Wave® AC/DC 1000® SD, manufactured by The Lincoln Electric Company, of Cleveland, Ohio. Other similar power supplies can be used.

As shown, the power supplies are coupled to welding torches 106 and 110, respectively. The torches 106 and 110 are positioned adjacent to each other such that they are directing their respective filler wires 107 and 111 to a common weld joint and weld puddle during welding. The filler wires 107 and 111 are provided to the torches via wire feeding mechanisms 105 and 109, respectively, which can be any known type of wire feeding mechanism.

The system 100 also has a ground switch 113 which couples at least two different ground points A and B to the grounds of the power supplies 101, 101', 103 and 103'. The ground points A and B are positioned remotely from each other on distal ends of the work piece W and are generally positioned in line with the travel direction of the weld joint being made during the welding process. That is, during welding the torches 106/110 are generally traveling toward and away from the respective ground points A and B. The switch 113 is used to change the ground current path being utilized by the power supplies between points A and B during welding. This will be described further below. The switch 113 can be controlled by a system controller 115 which is coupled to the switch 113 and at least one of the welding power supplies. In FIG. 1 the system controller 115 is shown external to the power supplies, but in some embodiments the controller 115 can be internal to at least one of the welding power supplies 101 and 103. That is, at least one of the power supplies can be a master power supply which controls the operation of the other power supplies and the switch 113. During operation, the system controller 115 (which can be any type of CPU, welding controller, or the like) controls the output of the welding power supplies and the switch 113. This can be accomplished in a number of ways. For example, the system controller 115, which can exist in one of the power supplies, can use real-time feedback data from the power supplies to ensure that the welding waveforms from the respective power supplies are properly synced (as described below). Further, the controller 115 controls the switch 113 consistent with the discussion below. In an exemplary embodiment, the controller 115 can use waveform timing signals from the waveform generators (not specifically shown) in the power supplies to control the timing of the switching of the switch 113. Other means to control the timing of the switch 113 can also be utilized. In an exemplary embodiment, the switch 113 is switched at a frequency consistent with the welding frequencies of the welding waveforms from the power supplies. This will be discussed further below.

FIG. 2 depicts an exemplary embodiment of a welding operation of the present invention, and FIG. 3 depicts exemplary welding waveforms to be used in embodiments of the present invention.

As shown in FIG. 2, each of the torches 106 and 110 are positioned adjacent each other such that they are welding into a common weld puddle. In the embodiment shown, each of the torches 106/110 is angled with respect to the normal of the work piece welding surface. The torch 110 is angled at the angle α and the torch 106 is angled at the angle β. In an exemplary embodiment, the torch 106 (which is the lead torch) has an angle β in the range of −20 to 0 degrees, and in a further exemplary embodiment has an angle β in the range of −3 to −15 degrees. Further, in an exemplary embodiment, the torch 110 has an angle α in the range of 0 to 30 degrees, and in a further exemplary embodiment has an angle α in the range of 8 to 20 degrees. Additionally, in exemplary embodiments the distance D between the distal ends of the respective wires 107 and 111 during welding is in the range of 6 to 50 mm (measured center to center of the wires 107 and 111), and in another exemplary embodiment is in the range of 15 to 40 mm. In yet a further exemplary embodiment, the distance D is in the range of 11 to 16 mm.

During welding, welding arcs 201 and 203 are generated from each of the wires 107 and 111, respectively, while the peak current levels in the arcs 201/203 are timed such that they do not overlap. In other exemplary embodiments, at least some overlap of the peak currents of the arcs 201/203 is provided. In exemplary embodiments, a phase angle Ø between the respective peak currents of the arcs 201/203 is in the range of 180 to −20 degrees. Furthermore, the ground switch 113 is controlled such that the respective current paths I1 and I2 are away from each other during welding. Specifically, the switch 113 is controlled such that the current is directed to the ground point A during a portion of the welding, while the current is directed to ground point B during the other portion of the welding. Thus, by switching between the ground points A and B the respective currents I1 and I2 will be biased away from each other. Such biasing will aid in minimizing arc interference between the arcs 201 and 203 during welding. Thus, when looking at the waveforms 301 and 310 in FIG. 3, the switch 113 is closed with respect to ground point A when the first waveform 301 (for torch 106) is at its peak 303 and open to ground point A when the waveform 301 is at its background level 305. Similarly, the switch 113 is closed with respect to the ground point B when the waveform 310 (for torch 110) is at its peak 313 and open with respect to ground point B when it is at its background level 315.

In an exemplary embodiment of the present invention, the switch 113 is switched between its positions while both currents 301 and 310 are at, or near, their background levels 305 and 315, respectively. This can minimize the impact of the switching on the welding operation and on the switch 113. In an exemplary embodiment of the present invention, the waveforms 301 and 310 can be controlled such that there is a slight delay between the end of one peak current level (e.g., 303) and the beginning of the next peak level (e.g., 313) to allow for the switching of the switch 113. During such a delay both waveforms can be at or near their background levels to allow for the switching of the switch 113.

In other exemplary embodiments of the present invention, the switching of the switch 113 can occur as the welding current of the waveforms 301 or 310 is increasing or decreasing, as needed. For example, in some welding applications it may be beneficial to switch the switch 113 between its positions while the current level L of a pulse is above the background level (e.g., 305) but at or below 15% of the peak pulse current (e.g., 303). Thus, for example, in some exemplary embodiments, the switch 113 can be switched from the ground position A to the ground position B while the current of the first waveform 301 is increasing from the background level 305 to the peak level 303 while the current is in the current level L (see point Z in FIG. 3). Similarly, in other exemplary embodiments the switch can occur while the current of the waveform 301 is in the level L, but while the current is going from the peak level 303 to the background level 305 (see point Y in FIG. 3). In another exemplary embodiment, the switching current level L is at or below 5% of the peak current level for the waveform.

Further, as shown in FIG. 3, in exemplary embodiments the respective welding waveforms are controlled such that they have a 180 degree phase shift Ø. As shown, each of the waveforms 301 and 310 has peak levels 303 and 313 and background levels 305 and 315, respectively. However, because the waveforms 301 and 310 are 180 degrees out-of-phase, while the first waveform 301 is in a peak current state the second waveform 310 is at a background level. This also aids in minimizing arc interference and arc blow. In such an embodiment the welding and deposition speed that can be achieved is much higher than in known systems. For example, exemplary embodiments of the present invention can be used for tack welding the seams of pipe and can achieve welding speeds of at least 10 m/min, with little or no issues with magnetic or electrical arc interference or arc blow. Embodiments of the present invention are not limited for use in just tack welding applications and can also be used for additional welding applications.

In the embodiment shown in FIG. 3, each of the waveforms 301 and 310 have the same pulse width peak amplitudes and the peak pulse width and background duration have the same time. However, in other exemplary embodiments these aspects of the waveforms can be different.

Figure 4:
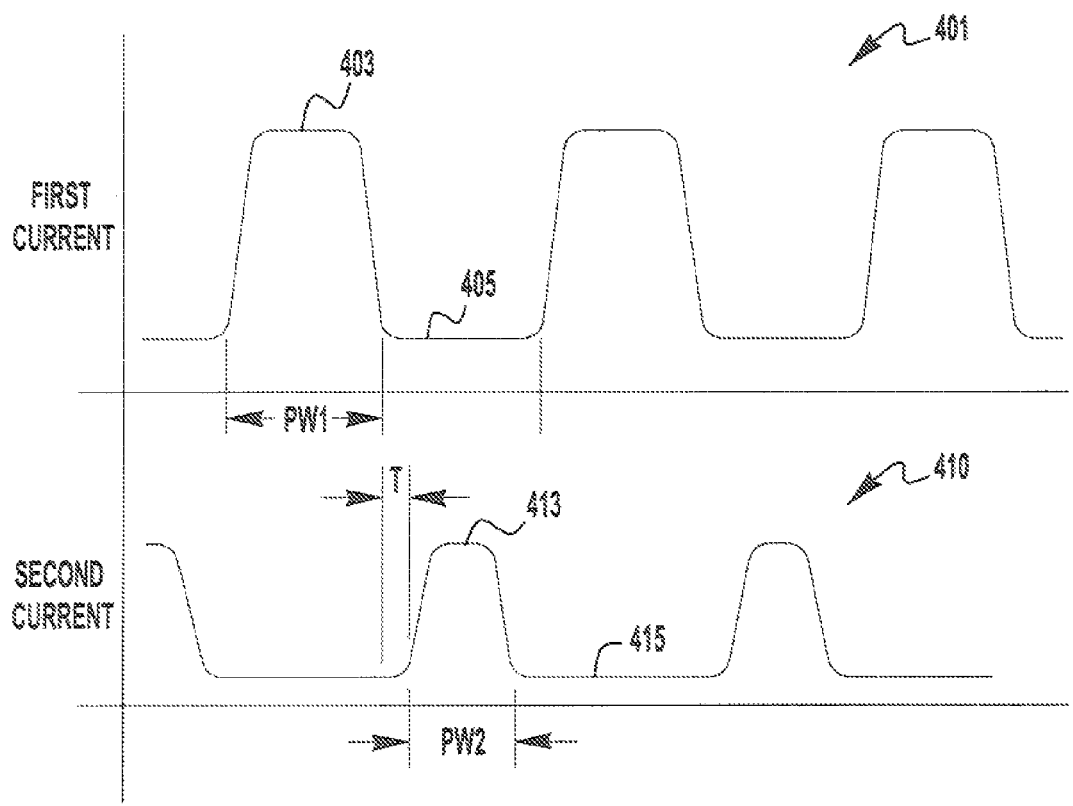
FIG. 4 is a diagrammatical representation of another exemplary welding waveform used with embodiments of the present invention.

FIG. 4 depicts further exemplary waveforms 401 and 410, where the waveforms have different parameters. Such embodiments of the present invention can be used when the respective wires 107 and 111 are different. In some exemplary embodiments the wires 107 and 111 can have different diameters and/or compositions. For example, the lead wire 107 can have a first diameter and the second wire 111 can have a second diameter, which is less than the first diameter. In such embodiments, the diameters are chosen to achieve the desired deposition rates and/or weld penetration. In most embodiments, where the diameters of the wires are different, the lead wire 107 will have the larger diameter. However, this need not always be the case. Similarly, in some embodiments of the present invention, the chemistries of the wires 107 and 111 can be different to achieve optimal weld chemistry. Thus, in some embodiments the lead wire 107 can have a first chemistry, while the trailing wire 111 can have a second chemistry, such that when combined the resultant weld will have the desired chemistry. In some exemplary embodiments, the wires 107 and 111 can be fed to weld joint at different wire feed speeds as well.

Because the wires 107 and 111 can be different in size, chemistry and wire feed speed, the respective waveforms used for each of the wires can be different. This is shown in FIG. 4, where the trailing waveform 410 has pulses 413 with a peak current level which is less than the peak of the pulses 403 for the leading waveform. Figure also shows that the current levels for the backgrounds of the waveforms, 405 and 415 respectively, are different. Further, the pulse width PW1 of the leading waveform pulse 403 is longer in duration than the pulse width PW2 of the pulses 413 of the trailing waveform 410. In other exemplary embodiments of the pulse width PW2 can be longer in duration than the pulse width PW1. FIG. 4 also shows that the trailing waveform 410 pulses 413 begin at a time T after the leading waveform 401 reaches its background level 405. In the embodiment shown in FIG. 4, the trailing waveform 410 pulses 413 begin and end during the background level 405 of the leading waveform 401. In other exemplary embodiments this may not be the case. For example, the trailing pulse 413 can end at the same time the leading pulse 403 begins (similar to what is shown in FIG. 2). The attributes of the respective waveforms 401 and 410 should be selected to weld the respective wires 107 and 111.

Figure 5:
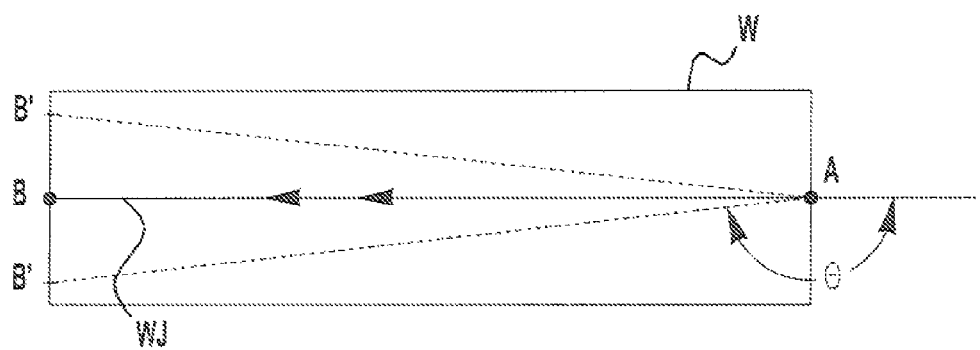
FIG. 5 is a diagrammatical representation of positioned of ground points in an exemplary embodiment of the present invention.

As stated above, the respective ground points A and B are positioned at or near the distal ends of the work piece W during welding. This is generally shown in FIG. 1 and is also depicted in FIG. 5. FIG. 5 depicts a representative work piece W having ground points A and B which are positioned in line with the weld joint travel direction WJ. That is, the ground points are co-linear with the weld joint travel direction WJ. However, in other exemplary embodiments at least one of the ground points is not positioned co-linearly with the weld joint travel direction WJ, but is rather offset. It is recognized that some welding work pieces W do not permit co-linear ground point positioning, and as such the ground points can be positioned in other positions. Thus, in some embodiments it is not necessary that the ground points A and B be co-linear with the weld joint travel direction WJ, and at least one ground point is offset such that the ground points A and B are positioned to provide current paths I1 and I2 which sufficiently diverge from each other so as to minimize arc interference during welding. In the embodiment shown in FIG. 5, the ground point B' is positioned off-line from the weld joint WJ, such that an angle θ exists between a first ground point A and a second ground point B, relative to the weld joint travel direction WJ. That is, if both ground points A and B are positioned co-linear in the weld joint travel direction WJ the angle θ is 180 degrees. In exemplary embodiments, the angle is in the range of 135 to 225 degrees, and in other exemplary embodiments the angle is in the range of 155 to 205 degrees. With such angles, the ground current paths I1 and I2 are sufficiently divergent. It should be noted that in those embodiments where the weld joint is not a straight line, the weld joint travel direction WJ is an average travel direction over the length of the weld joint.

It should be noted that although FIGS. 3 and 4 depict the exemplary waveforms as DC welding waveforms, the present invention is not limited in this regard as the pulse waveforms can also be AC.

It is also noted that not shown in either of FIGS. 1 and 2 is the use of shielding, which can take the form of a shielding gas. In some exemplary embodiments, the shielding gas used can be 100% $CO_2$. The shielding can be delivered used known methods of delivery shielding to such welding operations. For example, at least one shielding gas nozzle (not shown) can be placed adjacent the torches 106 and 110 in FIG. 2, such that the welding arcs 201 and 203, and weld puddle, are sufficiently shielded from the atmosphere.

The exemplary embodiments depicted herein can be used for buried arc welding processes, which are known to be open arc processes that use a shielding gas as opposed to using flux shielding, such as in submerged arc welding. Further, exemplary embodiments of the present invention can be used of tack welding, and more specifically for tack welding the seams in pipes and other large industrial seam tack welding applications.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding system, comprising:
at least one leading power supply electrically coupled to a leading electrode, where said leading power supply provides a first welding waveform to said leading electrode to deposit said leading electrode into a weld joint using an open arc welding process, where said first welding waveform comprises a plurality of pulses having a peak current level;
at least one trailing power supply electrically coupled to a trailing electrode, where said trailing power supply provides a second welding waveform to said trailing electrode to deposit said trailing electrode into said weld joint using an open arc welding process, where said second welding waveform comprises a plurality of pulses having a peak current level; and
a switch that is electrically disposed between ground terminals of the at least one leading power supply and the at least one trailing power supply and at least two ground points on a work piece, wherein said switch is controlled to change direction of a ground current path to the at least one leading power supply and the at least one trailing power supply based at least on a selected ground point from the at least two ground points on the work piece during an open arc welding process;
wherein at least one of said first and second welding waveforms is controlled such that said peak current levels of said pulses of said first welding waveform are out of phase with said peak current levels of said pulses of said second welding waveform.

2. The system of claim 1, wherein each of said leading and trailing electrodes are deposited into a common weld puddle to form said weld joint.

3. The system of claim 1, wherein said leading electrode is oriented at an angle in the range of 0 to −20 degrees with respect to a normal to said weld joint during welding.

4. The system of claim 1, wherein said trailing electrode is oriented at an angle in the range of 0 to 30 degrees with respect to a normal to said weld joint during welding.

5. The system of claim 1, wherein said leading electrode is oriented at an angle in the range of −3 to −15 degrees with respect to a normal to said weld joint during welding, and said trailing electrode is oriented at an angle in the range of 8 to 20 degrees with respect to said normal.

6. The system of claim 1, wherein a distance between said leading and trailing electrodes is in the range of 6 to 50 mm during welding.

7. The system of claim 1, wherein said first and second welding waveforms are out-of-phase by 180 degrees.

8. The system of claim 1, wherein said first and second welding waveforms are out-of-phase by 180 to −20 degrees.

9. The system of claim 1, wherein at least one of an amplitude and duration of said peak current levels of said first welding waveform are different than an amplitude and duration of said peak current levels of said second welding waveform.

10. The system of claim 1, wherein said first welding waveform further comprises background portions between said plurality of pulses of said first welding waveform, and said second welding waveform further comprises background portions between said plurality of pulses of said second welding waveform, and wherein the peak current level of each of said plurality of pulses for at least one of said first welding waveform and said second welding waveform occurs entirely during the background portions of the other of said first welding waveform and second welding waveform.

11. The system of claim 1, wherein said open arc welding process is a tack welding process.

12. A method of welding, comprising:

providing a first welding waveform to a leading electrode to deposit said leading electrode into a weld joint using an open arc welding process, where said first welding waveform comprises a plurality of pulses having a peak current;

providing a second welding waveform to said trailing electrode to deposit said trailing electrode into said weld joint using an open arc welding process, where said second welding waveform comprises a plurality of pulses having a peak current level; and controlling at least one of said first and second welding waveforms such that said peak current levels of said pulses of said first welding waveform are out of phase with said peak current levels of said pulses of said second welding waveform; and selecting between a first ground current path and a second ground current path on a work piece for at least one of said first welding waveform or second welding waveform during said open arc welding process by controlling a switch that is electrically disposed between ground terminals of a power supply providing the first welding waveform and a power supply providing said second welding waveform and at least two around points on the work piece.

13. The method of claim 12, wherein each of said leading and trailing electrodes are deposited into a common weld puddle to form said weld joint.

14. The method of claim 12, wherein said leading electrode is provided at an angle in the range of 0 to −20 degrees with respect to a normal to said weld joint during welding.

15. The method of claim 12, wherein said trailing electrode is provided at an angle in the range of 0 to 30 degrees with respect to a normal to said weld joint during welding.

16. The method of claim 12, wherein said leading electrode is provided at an angle in the range of −3 to −15 degrees with respect to a normal to said weld joint during welding, and said trailing electrode is provided at an angle in the range of 8 to 20 degrees with respect to said normal.

17. The method of claim 12, wherein each of said leading and trailing electrodes are provided to said weld joint such that a distance between said leading and trailing electrodes is in the range of 6 to 50 mm during welding.

18. The method of claim 12, wherein said first and second welding waveforms are controlled to be out-of-phase by 180 degrees.

19. The method of claim 12, wherein said first and second welding waveforms are controlled to be out-of-phase by 180 to −20 degrees.

20. The method of claim 12, wherein said first and second welding waveforms are controlled so that at least one of an amplitude and duration of said peak current levels of said first welding waveform are different than an amplitude and duration of said peak current levels of said second welding waveform.

21. The method of claim 12, wherein said first welding waveform further comprises background portions between said plurality of pulses of said first welding waveform, and said second welding waveform further comprises background portions between said plurality of pulses of said second welding waveform, and wherein the peak current level of each of said plurality of pulses for at least one of said first welding waveform and said second welding waveform occurs entirely during the background portions of the other of said first welding waveform and second welding waveform.

22. The method of claim 12, wherein said open arc welding process is a tack welding process.

* * * * *